US012718121B2

(12) United States Patent
Atmaca et al.

(10) Patent No.: US 12,718,121 B2
(45) Date of Patent: Aug. 25, 2026

(54) SYSTEMS AND METHODS FOR RECALL ESTIMATION

(71) Applicant: Walmart Apollo, LLC, Bentonville, AR (US)

(72) Inventors: Eren Atmaca, San Jose, CA (US); Samrat Kokkula, Sunnyvale, CA (US); Theban Solomon Stanley, San Bruno, CA (US); Quoc Tan Tran, San Carlos, CA (US); Alessandro Magnani, Palo Alto, CA (US); Chhavi Yadav, La Jolla, CA (US); Abon Chaudhuri, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 1241 days.

(21) Appl. No.: 17/527,426

(22) Filed: Nov. 16, 2021

(65) Prior Publication Data

US 2023/0004836 A1 Jan. 5, 2023

Related U.S. Application Data

(60) Provisional application No. 63/217,666, filed on Jul. 1, 2021.

(51) Int. Cl.
*G06N 5/04* (2023.01)
*G06Q 30/0601* (2023.01)

(52) U.S. Cl.
CPC .......... *G06N 5/04* (2013.01); *G06Q 30/0625* (2013.01)

(58) Field of Classification Search
CPC ....... G06N 20/00; G06N 5/04; G06Q 30/0625
See application file for complete search history.

(56) References Cited

U.S. PATENT DOCUMENTS

2017/0286864 A1* 10/2017 Fiedel ..................... G06F 9/546
2019/0171169 A1* 6/2019 Di Pietro .............. H04L 43/024

OTHER PUBLICATIONS

Al-Kateb, Mohammed et al. “Stratified Reservoir Sampling over Heterogeneous Data Streams.” Scientific and Statistical Database Management. Berlin, Heidelberg: Springer Berlin Heidelberg, 2010. 621-639. Web. (Year: 2010).*

Mohammed Al-Kateb, Byung Suk Lee, Adaptive stratified reservoir sampling over heterogeneous data streams, Information Systems, vol. 39, 2014, pp. 199-216, ISSN 0306-4379, https://doi.org/10.1016/j.is.2012.03.005. (https://www.sciencedirect.com/science/article/pii/S0306437912000518) (Year: 2014).*

* cited by examiner

*Primary Examiner* — Kevin L Young
(74) *Attorney, Agent, or Firm* — FOLEY & LARDNER LLP

(57) ABSTRACT

Some embodiments include systems and methods for recall estimation. An exemplary method comprises determining reservoir sampling and size of labeling from each strata; determining recall and variance for each strata; determining sum of sample size for a time period; and determining reservoir sampling for each strata and label the sample items. Other embodiments are described.

20 Claims, 10 Drawing Sheets

116
114
Hard Drive
Universal Serial Bus
112
CD-Rom Drive
220
208
Network Adapter
Memory ROM/RAM
204
Disk Controller
Graphics Adapter
224
214
System Bus
226
206
202
Video Controller
CPU
Keyboard Adapter
Mouse Adapter
Other I/O Devices
222
210
106
Monitor
Keyboard
Mouse
104
110

SYSTEMS AND METHODS FOR RECALL ESTIMATION

CROSS-REFERENCE TO RELATED APPLICATIONS

This application is a continuation of U.S. Provisional Patent Application No. 63/217,666, filed Jul. 1, 2021. U.S. Application No. 63/217,666 is incorporated herein by reference in its entirety.

TECHNICAL FIELD

This disclosure relates generally to anomaly detection, and more particularly to systems and methods for recall estimation.

BACKGROUND

Users commonly conduct an online search at a website or within an app for products with attributes that the users wish to view. These attributes commonly are associated with product types in a product catalog that are utilized to display information (e.g., products) to the user. Often, the accuracy and coverage of product types in the product catalog can significantly affect a user's experience with the website or app. However, product types can sometimes be incorrect. These errors can result in a computer system displaying products that are not associated with what a user is searching for, or displaying non-compliant (e.g., offensive) material to the user.

BRIEF DESCRIPTION OF THE DRAWINGS

To facilitate further description of the embodiments, the following drawings are provided in which.

Figure 1:
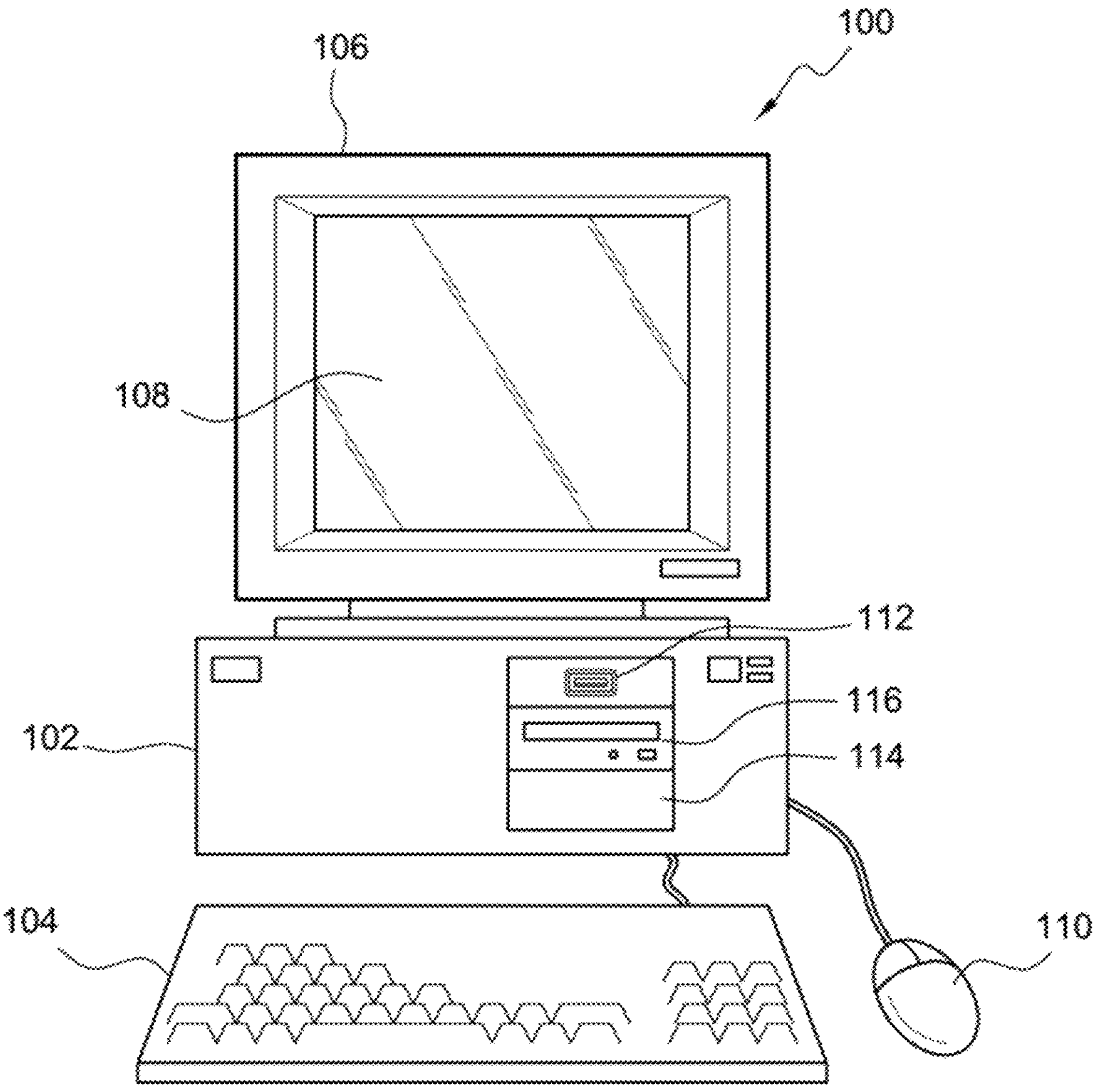
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, or a minute.

DESCRIPTION OF EXAMPLES OF EMBODIMENTS

A number of embodiments can include a system. The system can comprise one or more processors. The system also can comprise one or more non-transitory computer-readable media storing computing instructions that, when executed on the one or more processors, perform: determining reservoir sampling and size of labeling from each strata; determining recall and variance for each strata; determining sum of sample size for a time period; and determining reservoir sampling for each strata and label the sample items.

A number of other embodiments can include a method. The method can be implemented via execution of computing instructions configured to run at one or more processors and configured to be stored at non-transitory computer-readable media. The method can comprise determining reservoir sampling and size of labeling from each strata; determining recall and variance for each strata; determining sum of sample size for a time period; and determining reservoir sampling for each strata and label the sample items.

In computing platforms, the quality of the product or content plays a key role in delivering a satisfactory experience to its customers. With the rapid growth of e-commerce, it became challenging to control the quality of the products with traditional methods such as manual review or heuristic rule driven engagement in terms of the trust and safety perspective. In recent years, the high quality of the content is increasing along with huge amount of bad quality content in the e-commerce platforms. Though minuscule compared to the size of the catalog, this anomaly content can have an outsized impact on the user experience and the e-commerce platform's reputation. At this juncture, the machine learning driven solutions are key factors to capture the anomalies in the system. In general, one of the biggest concerns in such anomaly detection scenario is to measure and track the actual recall in the real world. Scarcity on anomaly events make it difficult to measure recall in a development environment. Embodiments disclosed herein provide a solution on how to measure and track the recall metric of our deep learning driven solutions with a combination of sophisticated sampling techniques.

In such big e-commerce systems, a limitation in ML-based solutions is that the data source is so vast that one has difficulty replicating the exact distribution into the training/test data set. This challenge of replication results in a discrepancy between the performance metrics in the test and production environments; e.g., false positive rates or recall/precision. It is difficult to discern the performance metric in the production environment for rare event detection with a simple random sampling alone, as the data is not distributed normally or is highly skewed so that the ratio of positive over negative items is 1,000-10,000 times larger. Embodiments disclosed herein use limited labeling resources to estimate performance metrics in live traffic with a smart sampling technique.

Embodiments disclosed herein obtain a precise estimate of ML based model performance via as small a labelling resource as possible for rare events in the production environment. To do so, embodiments disclosed herein go over the advanced sampling techniques put in place into the live production traffic.

Figure 2:
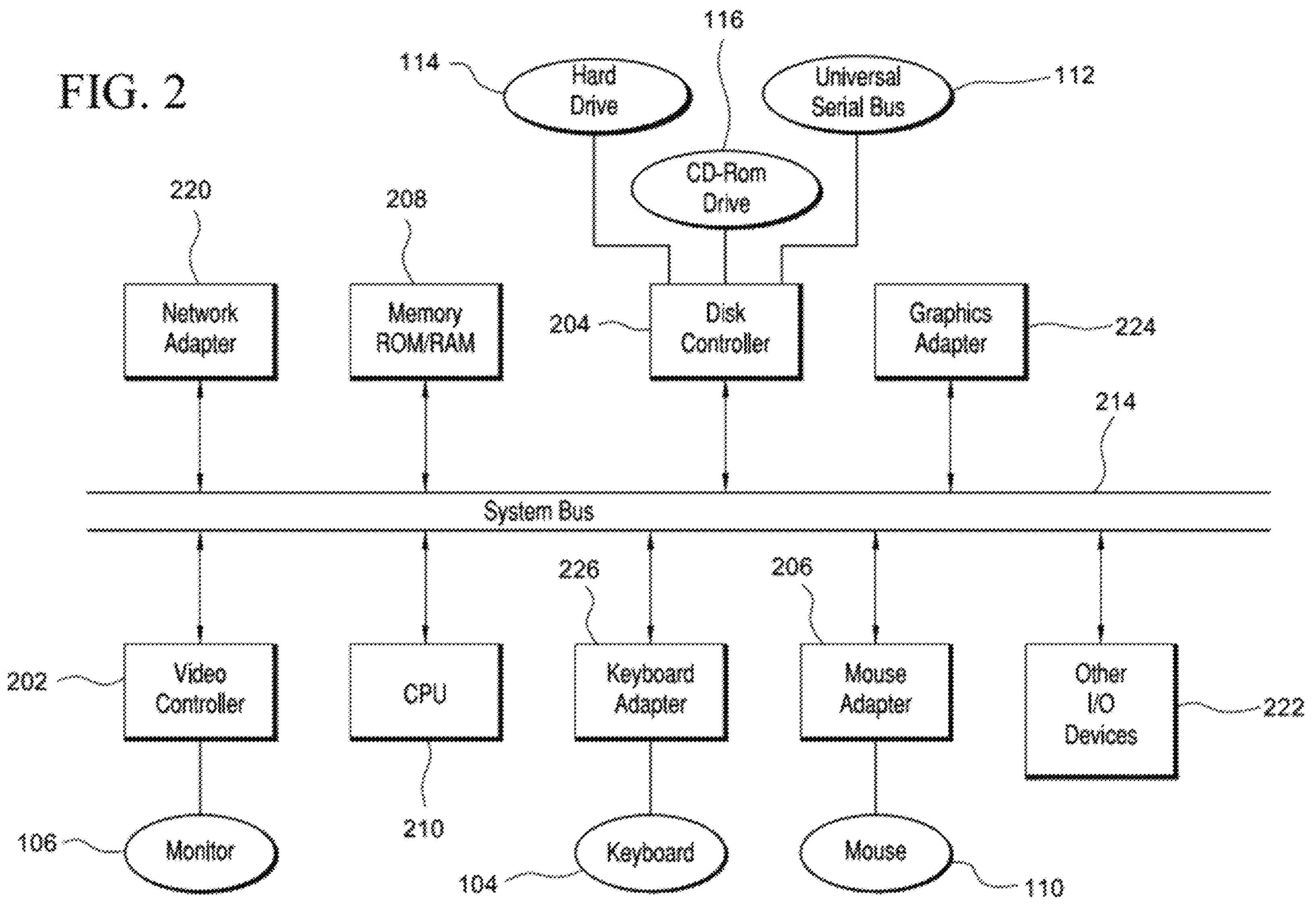
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIGS. 1-2). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) or Field Programmable Gate Arrays (FPGAs) can be programmed to carry out one or more of the systems and procedures described herein. For example, one or more of the programs and/or executable program components described herein can be implemented in one or more ASICs or FPGAs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
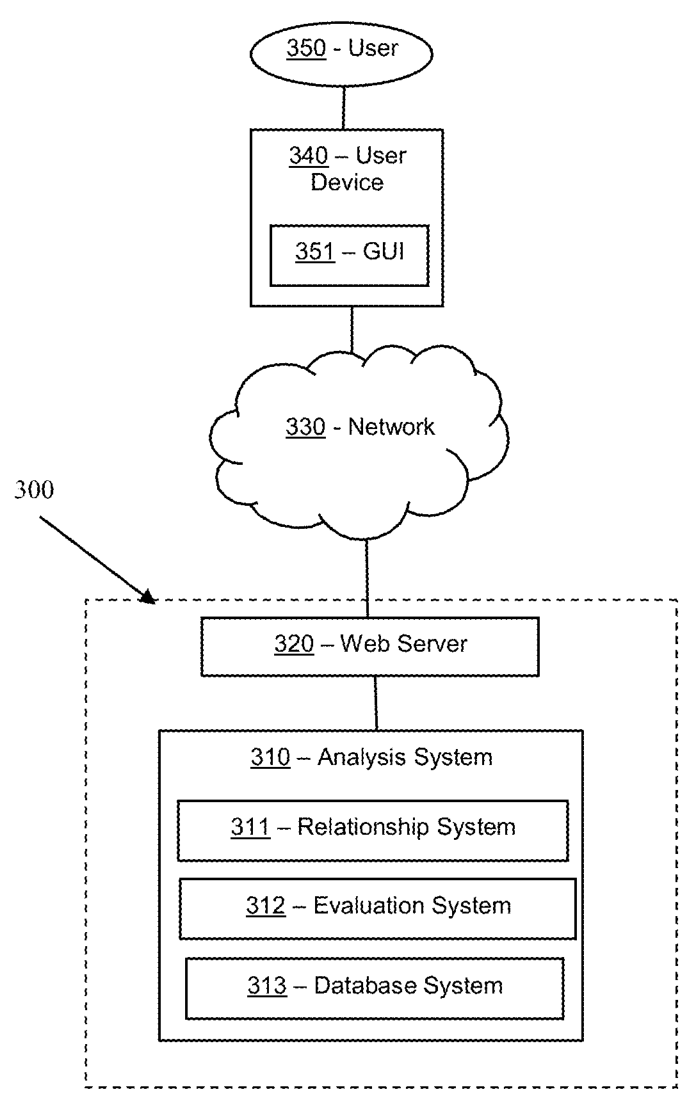
FIG. 3 illustrates a representative block diagram of a system, according to an embodiment.

Turning ahead in the drawings, FIG. 3 illustrates a block diagram of a system 300 that can be employed for determining and analyzing infrastructure components, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include an analysis system 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Analysis system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host analysis system 310 and/or web server 320. Additional details regarding analysis system 310 and/or web server 320 are described herein.

In some embodiments, web server 320 can be in data communication through a network 330 with one or more user devices, such as a user device 340. User device 340 can be part of system 300 or external to system 300. Network 330 can be the Internet or another suitable network. In some embodiments, user device 340 can be used by users, such as a user 350. In many embodiments, web server 320 can host one or more websites and/or mobile application servers. For example, web server 320 can host a web site, or provide a server that interfaces with an application (e.g., a mobile application), on user device 340, which can allow users (e.g., 350) to interact with infrastructure components in an IT environment, in addition to other suitable activities. In a number of embodiments, web server 320 can interface with analysis system 310 when a user (e.g., 350) is viewing infrastructure components in order to assist with the analysis of the infrastructure components.

In some embodiments, an internal network that is not open to the public can be used for communications between analysis system 310 and web server 320 within system 300. Accordingly, in some embodiments, analysis system 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, mobile devices, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, analysis system 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to analysis system 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of analysis system 310 and/or web server 320. In a similar manner, the processors and/or the non-transitory computer-readable media can be local and/or remote to each other.

Meanwhile, in many embodiments, analysis system 310 and/or web server 320 also can be configured to communicate with one or more databases, such as a database system 313. The one or more databases can include a product database that contains information about products, items, or SKUs (stock keeping units), for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, analysis system 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, analysis system 310 can include a relationship system 311, an evaluation system 312, and/or a database system 313. In many embodiments, the systems of analysis system 310 can be modules of computing instructions (e.g., software modules) stored at non-transitory computer readable media that operate on one or more processors. In other embodiments, the systems of analysis system 310 can be implemented in hardware. Analysis system 310 and/or web server 320 each can be a computer system, such as computer system 100 (FIG. 1), as described above, and can be a single computer, a single server, or a cluster or collection of computers or servers, or a cloud of computers or servers. In another embodiment, a single computer system can host analysis system 310 and/or web server 320. Additional details regarding analysis system 310 and the components thereof are described herein.

In many embodiments, system 300 can comprise graphical user interface ("GUI") 351. In the same or different embodiments, GUI 351 can be part of and/or displayed by user computer 340, which also can be part of system 300. In some embodiments, GUI 351 can comprise text and/or graphics (image) based user interfaces. In the same or different embodiments, GUI 351 can comprise a heads up display ("HUD"). When GUI 351 comprises a HUD, GUI 351 can be projected onto a medium (e.g., glass, plastic, etc.), displayed in midair as a hologram, or displayed on a display (e.g., monitor 106 (FIG. 1)). In various embodiments, GUI 351 can be color, black and white, and/or greyscale. In many embodiments, GUI 351 can comprise an application running on a computer system, such as computer system 100 (FIG. 1), user computers 340. In the same or different embodiments, GUI 351 can comprise a website accessed through internet 320. In some embodiments, GUI 351 can comprise an eCommerce website. In these or other embodiments, GUI 351 can comprise an administrative (e.g., back end) GUI allowing an administrator to modify and/or change one or more settings in system 300. In the same or different embodiments, GUI 351 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

In some embodiments, web server 320 can be in data communication through Network (e.g., Internet) 330 with user computers (e.g., 340). In certain embodiments, user computers 340 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, analysis system 310, and/or web server 320 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of analysis system 310, and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of analysis system 310, and/or web server 320. In a similar manner, the processing module(s) and the memory storage module(s) can be local and/or remote to each other.

In many embodiments, analysis system 310, and/or web server 320 can be configured to communicate with one or more user computers 340. In some embodiments, user computers 340 also can be referred to as customer computers. In some embodiments, analysis system 310, and/or web server 320 can communicate or interface (e.g., interact) with one or more customer computers (such as user computers 340) through a network or internet 330. Internet 330 can be an intranet that is not open to the public. In further embodiments, Internet 330 can be a mesh network of individual systems. Accordingly, in many embodiments, analysis system 310, and/or web server 320 (and/or the software used by such systems) can refer to a back end of system 300 operated by an operator and/or administrator of system 300, and user computers 340 (and/or the software used by such systems) can refer to a front end of system 300 used by one or more users 350, respectively. In some embodiments, users 350 can also be referred to as customers, in which case, user computers 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

In many embodiments, the techniques described herein can provide a practical application and several technological improvements. In some embodiments, the techniques described herein can provide for the detection of an anomaly (e.g., non-compliant, offensive material) and mitigation of displaying such an anomaly to a user via a GUI. These techniques described herein can provide a significant improvement over conventional approaches of anomaly detection. In many embodiments, the techniques described herein can beneficially make determinations of anomalies and remove such anomalies. In this way, the techniques described herein can avoid problems with stale and/or outdated machine learned models by continually updating anomaly detection engines.

In a number of embodiments, the techniques described herein can advantageously provide an improvement in the user experience by mitigating the display of offensive material. In various embodiments, the techniques described herein can dynamically remove offensive material in real time, as described in further detail below. This, in turn, can update GUI's to remove the offensive material and improve operation of the computing system.

In many embodiments, the techniques described herein can be used continuously at a scale that cannot be reasonably performed using manual techniques or the human mind. For example, processing millions of products within milliseconds cannot be feasibly completed by a human In a number of embodiments, the techniques described herein can solve a technical problem that arises only within the realm of computer networks, as online orders do not exist outside the realm of computer networks.

In many embodiments, the techniques described herein can solve a technical problem in a related field that cannot be solved outside the context of computer networks. Specifically, the techniques described herein cannot be used outside the context of computer networks due to a lack of data and because the machine learning model cannot be performed without a computer system and/or network.

Figure 4:
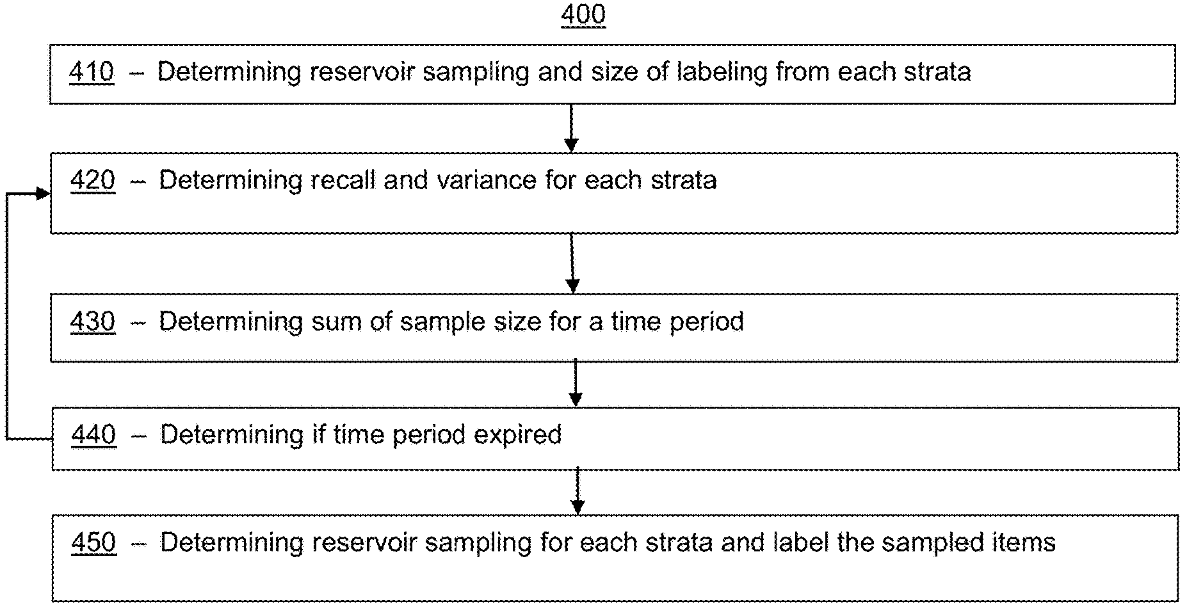
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as analysis system 310, web server 320, and/or user device 340 (FIG. 3). The processing module(s) can be similar or identical to the processing module(s) described above with respect to computer system 100 (FIG. 1).

In many embodiments, method 400 can comprise an activity 410 of determining reservoir sampling and size of labeling from each strata. In some embodiments, the size of data or logs flowing though the streams are not a known fact, embodiments disclosed herein use reservoirs to maintain a uniform distribution in the sampling. In other words, the reservoir provides the same chance for all items to be picked by the random sampling technique, regardless of the order in which the application sees the items. As a result, random sampling may not be applicable to a streaming data set. In some embodiments, reservoir sampling is a version of random sampling. In rare event or anomaly detection, this sampling either barely works or needs a huge number of samples to determine the exact precision, recall, and other performance values due to the highly skewed data set. To take "skewness" into consideration, embodiments disclosed herein either stratify the data before sampling or use stratified sampling instead. Stratified-random sampling is also called proportional or quota random sampling involves dividing the entire population into homogeneous groups called strata. Random samples are then selected from each stratum. When the distribution of labels in the data is highly skewed, a simple random/reservoir sampling might result in the selection of only positive or negative data (especially if the sampling size is very small). The stratified sampling can be used to address this problem (provided the "skewness" is a factor in the stratification step); however, it is not enough to get the precise estimate. Therefore, embodiments disclosed herein have used a sophisticated sampling technique that is a version of reservoir stratified random sampling, and this technique keeps the sample size as small as possible by keeping the estimation as precise as possible.

Embodiments disclosed herein overcame the sampling challenge presented through highly skewed data by adding variance into the consideration along with reservoir stratified random sampling.

Reservoir-Stratified Random Sampling based on Variance. Embodiments disclosed herein used stratified sampling with different reservoir sizes for each stratum defined based on the variance. In this embodiment, the model scores are used to define the border of each strata called bins. This is a fair assumption if the model is trained across all types of data sources or if the model is generalized enough over a large catalog. Hereby, the model score corresponds to how strong candidate for rare events.

$$\text{Precision} = \frac{TP}{TP + FP} \tag{1}$$

$$\text{Recall} = \frac{TP}{TP + FN} \tag{2}$$

In general, people look for and investigate all events detected by the model in rare event detection applications. With this assumption, the precision (1) is calculated by factoring in True Positives (TP) and False Positives (FP). However, the recall is not known unless all streams are manually annotated. To calculate the recall in the production environment, embodiments disclosed herein find the size of False Negatives (FN) over the stream (2). Embodiments disclosed herein accomplish this by sampling the streams in such a way as to approximate the size of False Negatives instead of annotating all sources. Annotating all sources is impractical in large streams, or such streams with over 1M ingestions per day.

Figure 5:
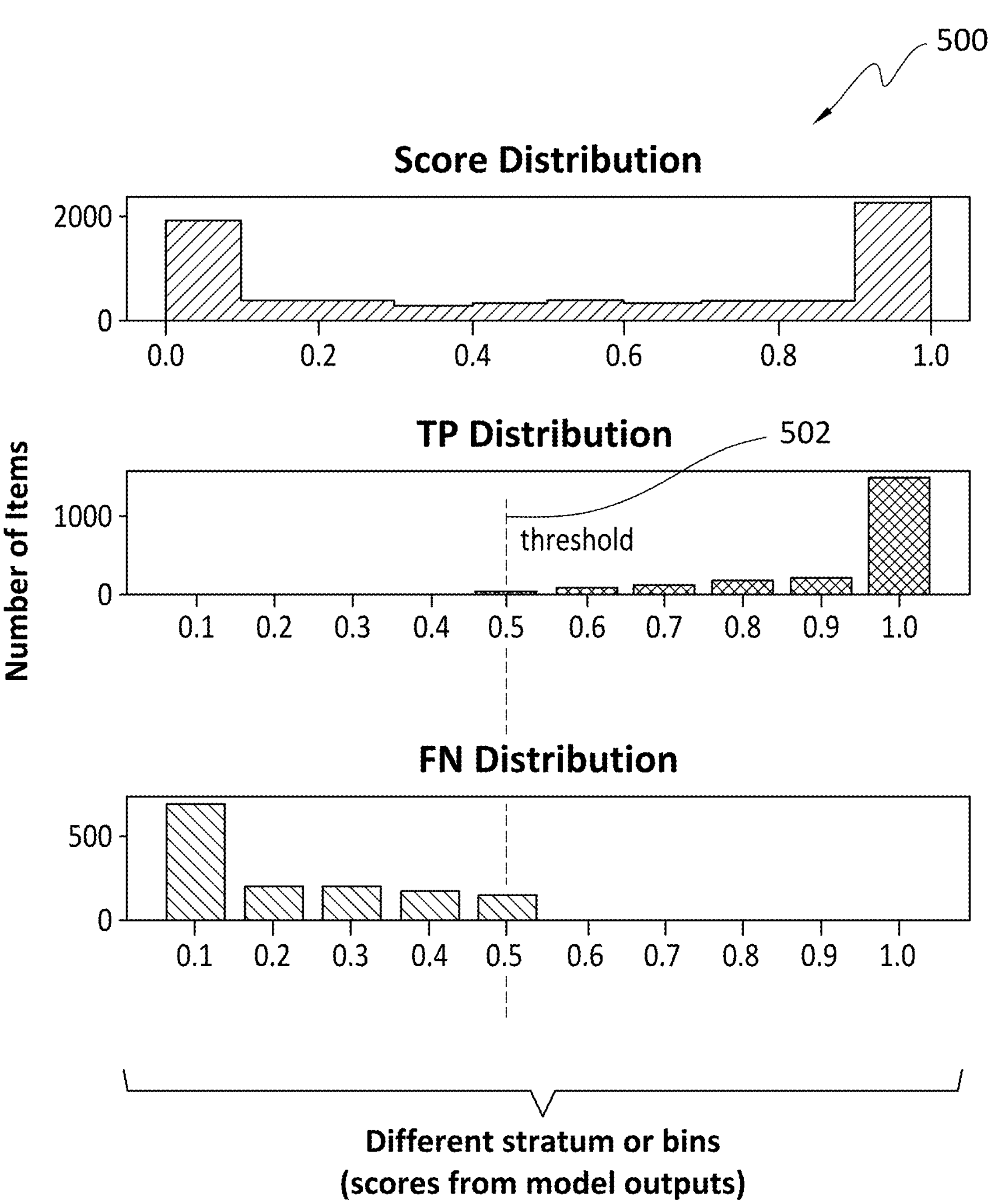
FIG. 5 illustrates a data relationship, according to certain embodiments.

Turning briefly to FIG. 5, a data relationship 500 is illustrated. The data relationship 500 is a sample distribution. In the illustrated embodiment, a threshold 502 defines the border of True Positives and False Negatives. As highlighted before, a source usually investigates all True Positives and False Positives in the rare event, so this information corresponds the calculation of precision.

Returning to FIG. 4, in some embodiments, the method 400 can include an activity 420 of determining recall and variance for each strata. In some embodiments, the method allocates limited labeling resources among stratas by allocating the sample size evenly among the stratas where it is assumed that data is distributed evenly for each stratum. This approach is known as equal allocation (EQA). In some embodiments, that data is not uniformly distributed in real-world scenarios. Embodiments disclosed herein propose to look at the variance of recall values and allocate the majority of the source to where the variance is the highest. This approach is known as proportional allocation (PQE).

Figure 6:
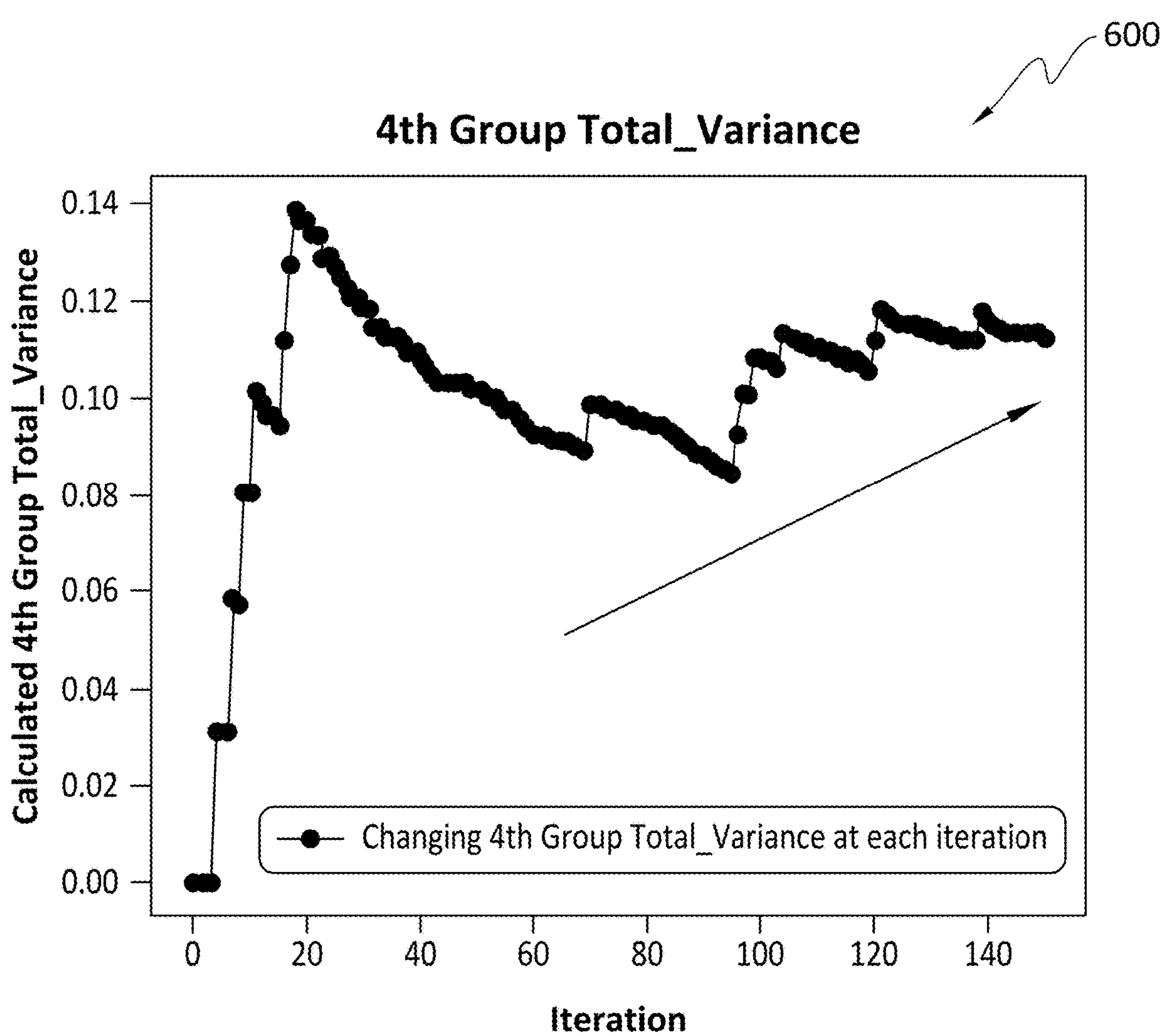
FIG. 6 illustrates a data relationship, according to certain embodiments.

Turning briefly to FIG. 6, a data relationship 600 is illustrated. In some embodiments, PQE is not targeted to eventually lower the variance after sampling. As illustrated in the data relationship 600 in FIG. 6, the estimation converges a value once the variance is lower. Therefore, embodiments disclosed herein target to lower the variance after each allocation. This approach is known as optimal allocation (OPT). When embodiments disclosed herein reach a lowest defined level of variance in each stratum, then embodiments disclosed herein know the estimation is converged. Embodiments disclosed herein can then stop the sampling, as no more samples are needed.

Returning to FIG. 4, in some embodiments, the method 400 can include an activity 430 of determining sum of sample size for a time period. In some embodiments, the time period can be a day, a week, a month, etc. In some embodiments, $W_k$ (3) is the ratio of sample size over total sample count in the $k^{th}$ strata while n is the total sample size so far/the sum of sample size ($n_k$) in each stratum (4).

$$W_k = \sum_{k=1}^{k} \frac{n_k}{n} \tag{3}$$

$$n = \sum_{k=1}^{k} n_k \tag{4}$$

$$n_k = n \times \frac{W_k \times S_k}{\sum_{k=1}^{k} W_k \times S_k} \tag{5}$$

Where, n: total number of sample; $n_k$: number of sample in kth strata; $W_k$: the ratio of sample size in kth strata over total number of sample; $S_k$: variance in the kth strata; $V(A^r)$: Variance after random sampling; $A^r$: an unbiased estimator of A (random); $A^s$: an unbiased estimator of A (strata); $a^i$: accuracy of the sampled dataset; k: number of the strata.

Figure 7:
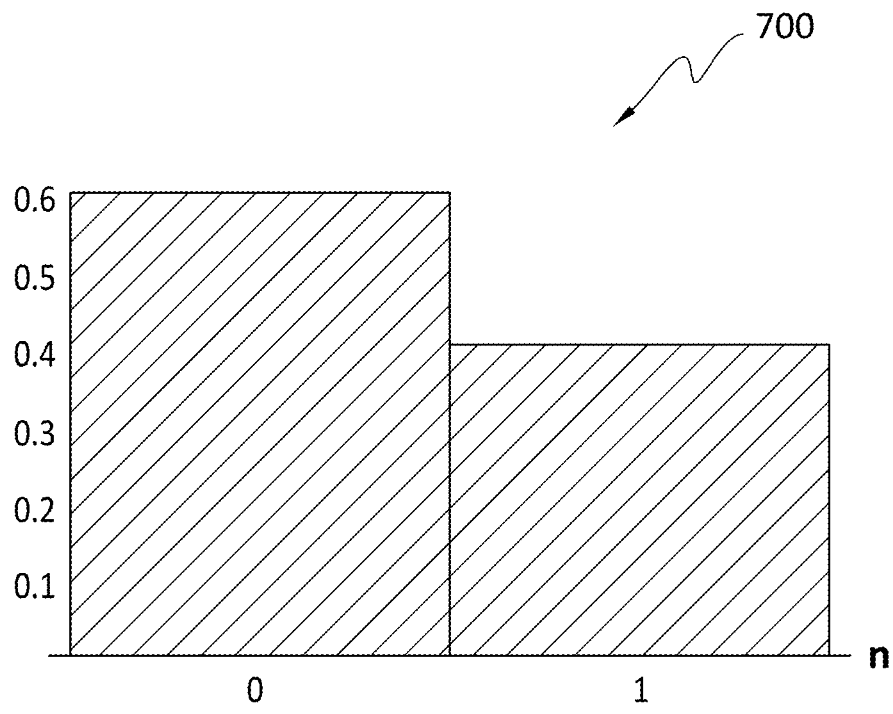
FIG. 7 illustrates a data relationship, according to certain embodiments.

Embodiments disclosed herein use Bernoulli distribution to calculate the variance in each stratum in FIG. 6. By definition, there is a binary case resulting in the item in particular bins being either True Positive or False Positive. Therefore, it is fair to use Bernoulli distribution as illustrated in the data relationship 700 of FIG. 7. The variance calculation in the Bernoulli distribution is shown in the equation (6).

$$S_k = p \times (1 - p) \tag{6}$$

Because, the recall and $$S_k^2$$

are both unknown in the initial step which, and this yields a result that is difficult to directly obtain values of $n_k$. To mitigate this issue, embodiments disclosed herein allocate a portion of our labeling resource for reservoir-strata sampling in the initial step (by using same amount of resource in each stratum). After embodiments disclosed herein obtained the initial estimate of $A_k$ (activity 420) by spending some select labeling resources in each stratum, after which embodiments disclosed herein are able to use/launch our smart sampling. Embodiments disclosed herein, leads us the minimum possible variance in recall estimation as it is highlighted. However, the allocation of n depends on the initial estimates of $$S_k^2$$

in each stratum. If the initial sampling of size $n_{init}$ is small and randomly sampled without considering the stratum, then there are challenges in trying to capture any single False Negative value which would be used in the calculation of $S_k^2$.

As such, the result is less than a good estimation of $$S_k^2$$

which may result in an equal allocation per stratum which is far from true optimal allocation. This outcome is far from true optimal allocation. Conversely, if the initial sampling of size $n_{init}$ is large, then we essentially end up spending a large sizeable proportion of the labeling resource and will lose the advantage of using this algorithms. If it is too rare (<0.001%), it is better to allocate relatively more labeling resources and, thereby, get more False Negatives caught in the initial sampling phase.

In some embodiments, the method 400 can include activity 440 of determining if a time period expired. In some embodiments, if the time period has expired, the method 400 returns to activity 420. In some embodiments, if the time period has not expired, the method 400 proceeds to activity 450 of determining reservoir sampling for each strata and label the sampled items. Since the algorithm heavily depends on an initial stratified sampling, it is difficult to converge the true allocation later when the smart algorithm is activated and it leads us to the wrong allocation. However, embodiments disclosed herein have mitigated the chance of an incorrect allocation based on initial sampling by also adding a time constraint (e.g., time period, daily initial sampling, monthly sampling, etc.). Embodiments disclosed herein allocate the same size of labeling ($n_{init}$) equally among the stratum once embodiments disclosed herein ramp up the new model to the production environment. Embodiments disclosed herein then wait to get enough False Negative data (depend on the size of traffic and application type) to calculate $$S_k^2$$

and $A^k$. Note that the amount of False Negative data needed varies, depending on the size of the traffic and the application type. The smart algorithm then activates and allocates the labeling resource in such a way that we will have the least amount of variance at the end. Embodiments disclosed herein then stop sampling once the recall value matures and is within a 1% range of a certain number of steps after a certain amount of time (as a constraint). Embodiments disclosed herein stop sampling here because the recall value is does not fluctuate much, even though we continue to sample.

Figure 8:
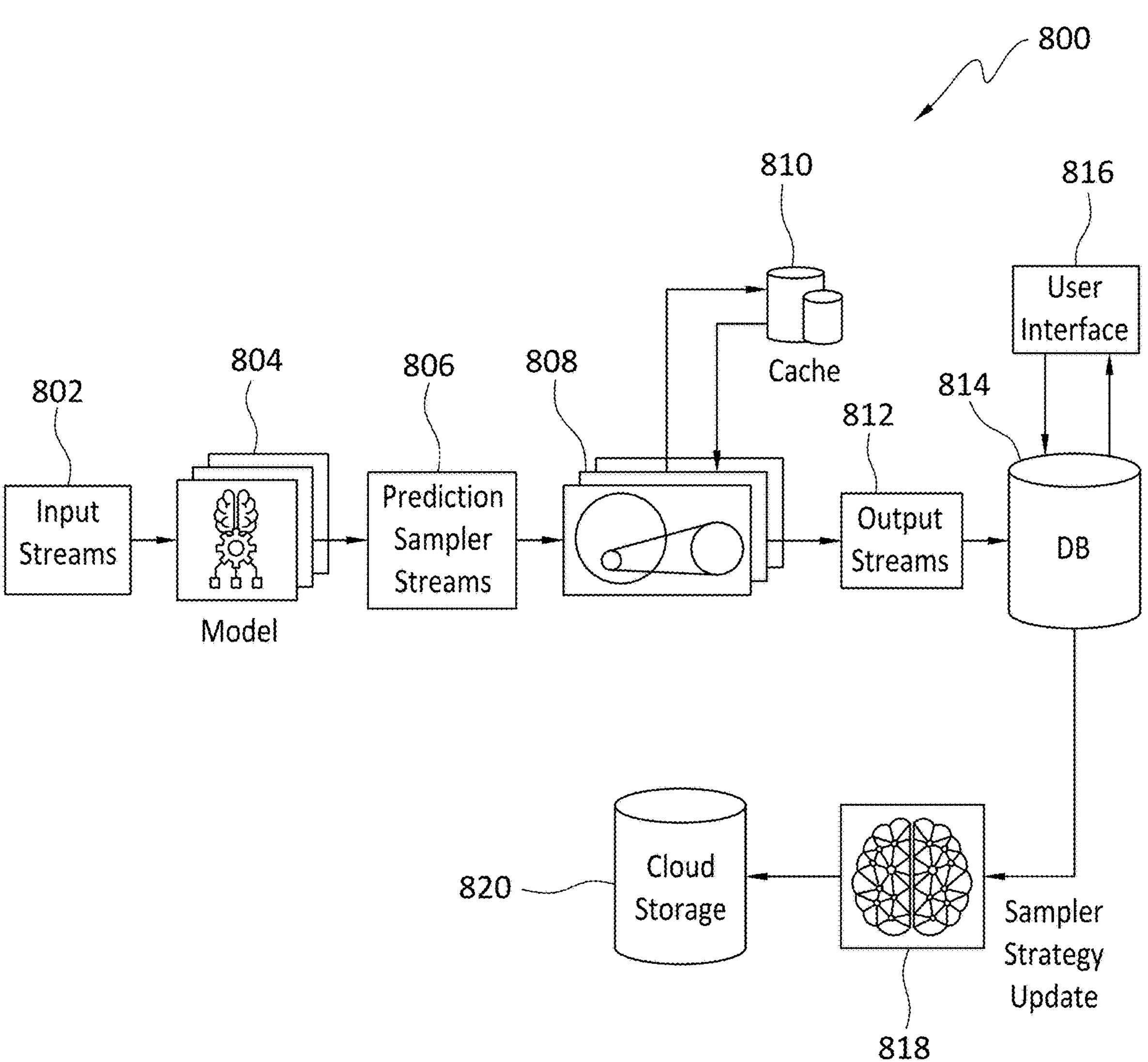
FIG. 8 illustrates an exemplary system architecture, according to certain embodiments.

Turning to FIG. 8, a system architecture 800 is illustrated, according to certain embodiments. In the illustrated embodiment, the system architecture 800 includes input streams 802, a model 804, prediction sampler streams 806, a sampler 808, a cache 810, output streams 812, a database 814, a user interface 816, sampler strategy update 818, and cloud storage 820. In some embodiments, the system architecture 800 is composed of different services. Embodiments disclosed herein have the input streams 802 (e.g., messages and requests) flowing through the message queue into model 804 (e.g., rare event detection model). The model 804 classifies the input streams 802 (e.g., requests) and writes the prediction sampler streams 806 into another queue which, in turn, is consumed by the sampler 808. In some embodiments disclosed herein, the sampler performs the method 400 of FIG. 4. At any given time—especially at peak traffic—embodiments disclosed herein might be making tens of thousands of updates to the cache 810. This scenario necessitates an efficient cache 810 implementation, a feat accomplished by taking advantage of a high throughput of inmemory databases like Redis. After a configurable accumulation period, the cache 810 is drained and output streams 812 are persisted into an annotation system (e.g., database 814 and user interface 816). Human annotators periodically tag the sampled messages via the user interface 816, and these tags help measure and track recall on a daily basis. Annotations on the sampled messages also update the sampling strategy 818; e.g. when calculating the $$S_k^2$$

and $n_k$ along with $W_k$. The updated allocation strategy is uploaded to a common cloud storage 820, and the samplers 808 are programmed to periodically poll this common cloud storage 820 and update themselves (e.g., samplers 808) on any changes to the allocation strategy.

Embodiments disclosed herein show that the pipeline not only provides a precise recall estimate but also captures more False Negatives with a limited labeling resource. Capturing False Negatives helps improve the model performance in the next training phase; i.e., the pipeline automatically collects the training data set. In addition, it shows the weakness of the model and helps one understand the skew in the data set. E.g., this pipeline captures that the model struggles to detect rare items in a specific color. However, since caught, False Negative items give users the chance to analyze where the model struggles. Eventually, data set diversification occurs in such a way as to ensure the least amount of bias in the model.

Since rare events change on a second-to-second basis, the algorithm captures the most recent offensive items with low score output. As such, getting this pipeline aids in gathering the most recent training samples, even if those specific objects are not used during the training process. The algorithm catches False Negatives along with True Negatives with a high degree of accuracy, so it aids in the collection of negative samples to reduce the False Positive rate.

Figure 9:
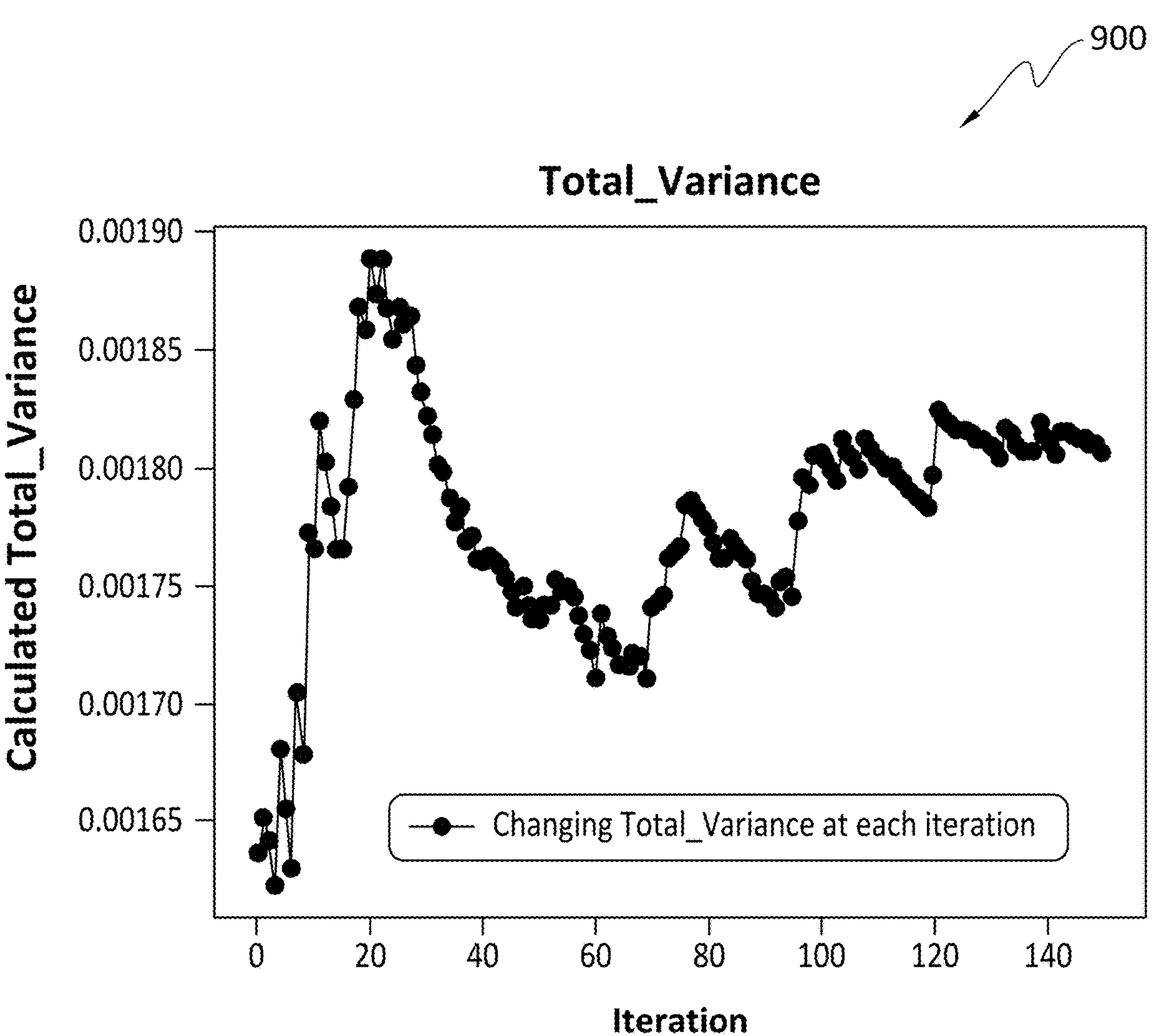
FIG. 9 illustrates a data relationship, according to certain embodiments.

Turning to FIG. 9, a data relationship 900 is illustrated according to certain embodiments. Embodiments disclosed herein tested the algorithm on 7,000 randomly generated samples. After 100 iterations with 20 samples per iteration, and following 50 random samples from each bin as an initial sampling step, the recall value is saturated within +/−5% of actual recall value. The variance is relatively high in the initial step, yet while it gets smoother and lower towards the $150^{th}$ iteration. This occurs as the algorithm tries to lower the variance. Once the variance in each stratum gets matures, it all corresponds to the value that was estimated as the precise recall metric.

Figure 10:
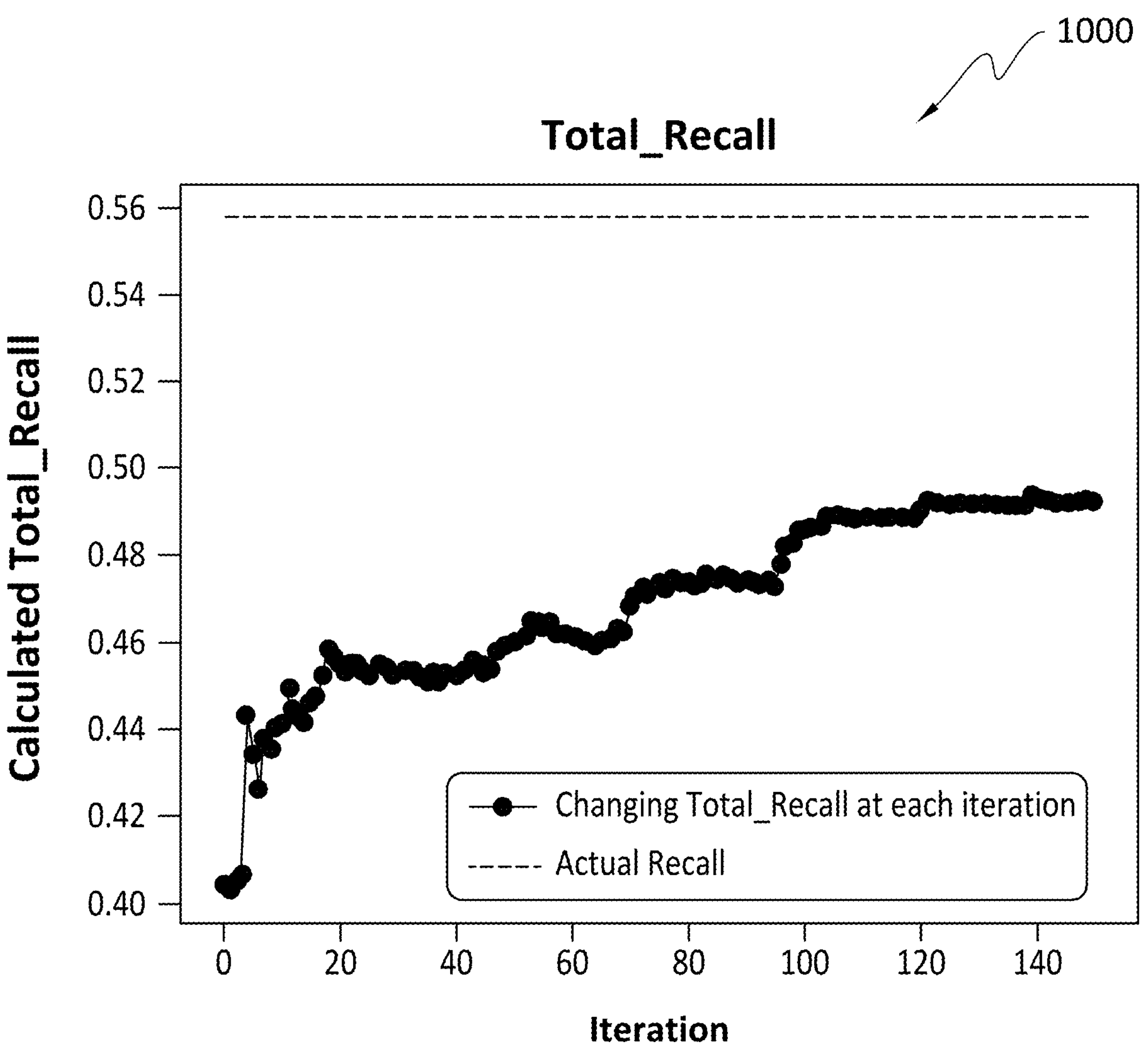
FIG. 10 illustrates a data relationship, according to certain embodiments.

Turning to FIG. 10, a data relationship 1000 is illustrated according to certain embodiments. Stabilizing the bins that contain the maximum variance will lead us to a precise estimation of the recall metric much sooner. For instance, the maximum variance in the Bernoulli distribution is 0.25, which corresponds to p=0.5 (6). This means that 1 out of 2 samples are False Negative. Based on the algorithm, this scenario necessitates placing a maximum labeling resource in the bin that has the highest variance to decrease the variation in the recall metric.

Embodiments disclosed herein benchmarked the performance of the new sampling technique against the random and stratified sampling. Performance comparison occurred by means of a binary classifier model. Note that the false omission rate is the ratio of the size of False Negatives over the sum of False Negatives and True Negatives. One needs all False Negatives and True Negatives to obtain the actual recall metrics (7).

$$FalseOmissionRate = \frac{FN}{TN + FN} \tag{7}$$

Increasing the false omission rate by means of the algorithm usually meant optimization in successfully sampling more False Negatives from live streams, unless the threshold sets were intentionally low to keep the recall higher than 95%.

While random sampling may not be a good technique to use in the anomaly/rare event detection, stratified sampling does an adequate job. However, stratified sampling may not enough to get the precise estimation of the recall metric (reference Table-1).

TABLE I

Performance of the algorithm

| Model | Metric | Random | Stratified Random | This Work |
|---|---|---|---|---|
| 1 | False Omission Rate | 0.5% | 10.7% | 23% |
| | Precision | 63.2% | 63.1% | 63.2% |
| | Recall | 99.8% | 90.2% | 82.1% |
| 2 | False Omission Rate | — | 3.6% | 7.3% |
| | Precision | — | 79.6% | 78.8% |
| | Recall | — | 83.7% | 73.5% |

Random sampling gives weights based on model score distribution where we have <0.05 the most frequency in rare event detection. It statistically samples more on the events where the model gives very low scores, since the likelihood of normal event occurrence is much more than the probability of rare event occurrence.

Reference Table-1 to view the marked improvement in the recall value estimation. The false omission rate increased by at least 45 times with respect to random sampling. In model-1, the recall value was 76% in the test data set during the model development phase. It is expected to see similar performance in the production environment. 82.1% recall is close to the actual value with a small number of labeled samples. Even though it seems stratified random sampling is doing relatively better in the model-2, the recall value with the new sampling technique is much better and close to 64.3%. Note that a combination of both the random and new techniques is 73.5%, as reported in Table-1.

If the occurrence of an abnormal/rare event is exceedingly rare, this method would then converge the realistic value with small amount of sampling. However, embodiments disclosed herein need to keep the initial sampling count more than expected, since the data skews toward the normal events. Conversely, if the occurrence of the abnormal event is relatively higher, then the suggested course of action is to sample more with this algorithm. This approach converges better after the initial stratified sampling phase.

In embodiments disclosed herein, the reservoir stratified sampling based on variance seems to work well in reducing the variance of False Negatives per stratum and adequately estimates the precise recall with respect to random/stratified sampling. Besides, embodiments disclosed herein found that the algorithm needs more samples when the expected recall value is relatively low. (Note that this algorithm performs ultimately much better than random or stratified sampling in most of cases).

The False Negative distribution seen throughout the initial sampling is much more essential when the label distribution in the test data is highly skewed (very exceedingly rare events). Note that we should have enough False Negatives distributed so that we could calculate the variance in each stratum. Otherwise this algorithm end up being equal allocation per stratum which is still better than random sampling that might may result in the selection of only True Negatives instead of False Negatives (especially if sample size (n) is very low).

As described herein, the machine learning models built for trust and safety or similar applications are trained on the very few positive (offensive) examples and some generic negative examples available during the training phase. Hence, it is critical to know if these models are achieving high enough coverage (recall rate) in production. However, since the models produce a much higher proportion of negative (non-offensive) predictions on the real data, it is prohibitively costly to review them manually to obtain an estimate of recall. Embodiments disclosed herein have come up with an intelligent sampling algorithm and a system around it that sends a small yet representative set of samples to the manual reviewers along with positive predictions and computes a reliable moving estimate of recall.

Returning to FIG. 3, in several embodiments, the relationship system 311, the evaluation system 312, and the database system 313 can at least partially perform the activities 410-450 of method 400.

Although recall estimation has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that any element of FIGS. 1-10 may be modified, and that the foregoing discussion of certain of these embodiments does not necessarily represent a complete description of all possible embodiments.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method implemented via execution of computing instructions at one or more processors, the method comprising:
receiving one or more input streams flowing through a message queue into a machine learning model;
using the machine learning model to classify the one or more input streams and provide one or more prediction sample streams into a different queue;
performing, based on the one or more prediction sample streams, reservoir stratified random sampling by using stratified sampling with different reservoir sizes for strata; and
terminating the reservoir stratified random sampling based on one or more of a time constraint, an amount of false negative data caught during the reservoir stratified random sampling, a recall value, or a level of variance reached in a stratum of the strata,
wherein terminating the reservoir stratified random sampling comprises one of:
terminating the reservoir stratified random sampling based on the level of variance reached in the stratum, or
terminating the reservoir stratified random sampling based on a fluctuation of the recall value.

2. The method of claim 1, further comprising:
determining one or more model scores for the machine learning model; and
defining, based on the one or more model scores and to obtain the different reservoir sizes for the strata, one or more borders of the strata.

3. The method of claim 2, wherein determining the one or more model scores for the machine learning model comprises:
determining the recall value based on a size of false negatives over a stream of the one or more prediction sample streams; and
determining a model score, of the one or more model scores, that corresponds to the recall value.

4. The method of claim 1, wherein performing the reservoir stratified random sampling comprises:
determining the recall value and a variance for the strata.

5. The method of claim 1, wherein performing the reservoir stratified random sampling comprises:
allocating, based on a variance of recall values, a majority of the one or more prediction sample streams to where the variance is highest.

6. The method of claim 1, wherein performing the reservoir stratified random sampling comprises:
allocating based on lowering the variance of the stratum after each allocation.

7. The method of claim 1, wherein terminating the reservoir stratified random sampling comprises:
terminating the reservoir stratified random sampling based on the level of variance reached in the stratum.

8. The method of claim 7, wherein terminating the reservoir stratified random sampling comprises:
terminating the reservoir stratified random sampling based on reaching the level of variance, reached in the stratum, in each stratum of the strata.

9. The method of claim 1, wherein the level of variance reached in the stratum is a lowest defined level of variance in each stratum of the strata.

10. The method of claim 1, wherein performing the reservoir stratified random sampling comprises:
allocating a select portion of labeling resources to each stratum of the strata,
using the select portion of labeling resources in each stratum of the strata, and
launching smart sampling, of the reservoir stratified random sampling, based on using the reservoir stratified random sampling.

11. The method of claim 1, wherein performing the reservoir stratified random sampling comprises:
determining that a time period, of the time constraint, has not expired, and
continuing to perform the reservoir stratified random sampling based on determining that the time period has not expired.

12. The method of claim 1, wherein terminating the reservoir stratified random sampling comprises:
determining that a time period, of the time constraint, has expired, and
terminating the reservoir stratified random sampling based on determining that the time period has expired.

13. The method of claim 1, wherein terminating the reservoir stratified random sampling comprises:
determining that the amount of false negative data caught during the reservoir stratified random sampling is enough, and
terminating the reservoir stratified random sampling based on determining that the amount of false negative data caught during the reservoir stratified random sampling is enough.

14. The method of claim 1, wherein terminating the reservoir stratified random sampling comprises:
determining that the amount of false negative data caught during the reservoir stratified random sampling is enough based on a size of traffic and an application type.

15. The method of claim 1, wherein terminating the reservoir stratified random sampling comprises:
determining that the recall value is within a particular range of a number of steps, and
terminating the reservoir stratified random sampling based on determining that the recall value is within the particular range of the number of steps.

16. The method of claim 15, wherein terminating the reservoir stratified random sampling comprises:
terminating the reservoir stratified random sampling based on determining that the recall value is within the particular range of the number of steps after an amount of time defined by the time constraint.

17. The method of claim 1, wherein terminating the reservoir stratified random sampling comprises:
terminating the reservoir stratified random sampling based on a fluctuation of the recall value.

18. The method of claim 1, further comprising:
updating an in-memory cache with output streams that are based on performing the reservoir stratified random sampling;
persisting the output streams into an annotation system by draining the in-memory cache after a configurable accumulation period;
updating a sampler strategy based on annotations on sampled messages that are tagged using the annotation system;
uploading the sampler strategy to a common cloud storage after updating the sampler strategy; and
updating, using a sampler that is configured to perform the reservoir stratified random sampling, the sampler by polling a common cloud storage for the sampler strategy.

19. One or more non-transitory, computer-readable media comprising instructions that, when executed by a system, cause the system to:

receive one or more input streams flowing through a message queue into a machine learning model;

use the machine learning model to classify the one or more input streams and provide one or more prediction sample streams;

perform, based on the one or more prediction sample streams, random sampling by using sampling for strata associated with the one or more prediction sample streams;

wherein, to perform the random sampling, the instructions comprise one or more instructions that cause the system to:

allocate a select portion of labeling resources to each stratum of the strata, use the select portion of labeling resources in each stratum of the strata, and launch smart sampling, of the random sampling, based on using the random sampling; and terminate the random sampling based on one or more of a time constraint, an amount of false negative data caught during the random sampling, a recall value being within a particular range, or a level of variance reached in a stratum of the strata.

20. A system for improving machine learning, the system comprising:

one or more processors; and one or more non-transitory computer-readable media storing computing instructions that, when executed on the one or more processors, cause the system to:

receive one or more input streams flowing through a message queue into a machine learning model;

use the machine learning model to classify the one or more input streams and provide one or more prediction sample streams into a different queue;

perform, based on the one or more prediction sample streams, reservoir stratified random sampling by using stratified sampling with different reservoir sizes for strata defined by a variance; and terminate the reservoir stratified random sampling based on a time constraint, based on an amount of false negative data caught during the reservoir stratified random sampling, and based on a recall value being within a particular range, wherein, to terminate the reservoir stratified random sampling, the instructions cause the system to:

determine that the amount of false negative data caught during the reservoir stratified random sampling is enough based on a size of traffic and an application type.

* * * * *